United States Patent
Hinsch et al.

(10) Patent No.: US 11,714,987 B2
(45) Date of Patent: Aug. 1, 2023

(54) IDENTIFICATION DEVICE, IDENTIFICATION SYSTEM AND METHOD FOR IDENTIFYING AN OBJECT

(71) Applicant: Fraunhofer-Gesellschaft zur Förderung der Angewandten Forschung e.V., Munich (DE)

(72) Inventors: Andreas Hinsch, Oberried (DE); Lukas Wagner, Freiburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/269,013

(22) PCT Filed: Aug. 13, 2019

(86) PCT No.: PCT/EP2019/071757
§ 371 (c)(1),
(2) Date: Feb. 17, 2021

(87) PCT Pub. No.: WO2020/035509
PCT Pub. Date: Feb. 20, 2020

(65) Prior Publication Data
US 2021/0326670 A1 Oct. 21, 2021

(30) Foreign Application Priority Data
Aug. 17, 2018 (DE) .................... 10 2018 120 103.6

(51) Int. Cl.
*G06F 17/00* (2019.01)
*G06K 19/07* (2006.01)
(Continued)

(52) U.S. Cl.
CPC ....... *G06K 19/0728* (2013.01); *G06K 7/0008* (2013.01); *G06K 19/06037* (2013.01)

(58) Field of Classification Search
CPC .. G06K 9/62; G06K 9/00496; G06K 7/10683; G06K 19/0637; G06K 19/06046; G06Q 10/0639
(Continued)

(56) References Cited

U.S. PATENT DOCUMENTS 4,914,444 A * 4/1990 Pifer ................. G04G 7/00
342/465
5,119,104 A * 6/1992 Heller ................. G06K 7/0008
380/34
(Continued)

FOREIGN PATENT DOCUMENTS

EP 2006797 12/2008
WO 2006046183 5/2006

OTHER PUBLICATIONS

CCD-Sensor In: Wikipedia, Die freie Enzyklopadie Bearbeitungsstand: Jul. 27, 2018. URL: https://de.wikipedia.org/w/index.php?title=CCD-Sensor&oldid=179496933, 10 pages, retrieved May 22, 2019.
(Continued)

*Primary Examiner* — Daniel St Cyr
(74) *Attorney, Agent, or Firm* — Volpe Koenig

(57) ABSTRACT

An identification device is provided having an optical detector (1), a controller (5) and an identification transmitter unit (6), wherein the optical detector (1) has a detection area with an identification pattern partially covering the detection area and the controller (5) is designed to interact with the detector (1) and the identification transmitter unit (6) in such a manner that the identification transmitter unit (6) can be activated to transmit an identification signal depending on an analysis of the temporal sequence of measurement signals
(Continued)

from the detector (1). A method is also provided for identifying an object by an identification system.

16 Claims, 5 Drawing Sheets

(51) Int. Cl.
*G06K 7/00* (2006.01)
*G06K 19/06* (2006.01)

(58) Field of Classification Search
USPC ..................................... 235/375, 377, 380
See application file for complete search history.

(56) References Cited

U.S. PATENT DOCUMENTS

| | | | |
|---|---|---|---|
| 5,355,222 A | 10/1994 | Heller et al. | |
| 5,874,724 A | 2/1999 | Cato | |
| 8,514,280 B2 * | 8/2013 | Zisa | H04N 5/33 340/572.1 |
| 8,724,006 B2 * | 5/2014 | Brady | H04N 3/1587 348/208.1 |
| 2005/0025893 A1 | 11/2005 | Kantrowitz et al. | |
| 2010/0096447 A1 | 4/2010 | Kwon et al. | |

OTHER PUBLICATIONS

Bao, C. [et. al]: High Performance and Stable All-Inorganic Metal Halide Perovskite-Based Photodetectors for Optical Communication Applications. In: Advanced Materials, 2018, 30. Jg., Nr. 38, S. 1803422. Jul. 31, 2018. Aufgerufen Ober: URL: https://onlinelibrary.wiley.com/doi/full/10.1002/adma.201803422, 8 pages, retrieved May 22, 2019.

* cited by examiner

IDENTIFICATION DEVICE, IDENTIFICATION SYSTEM AND METHOD FOR IDENTIFYING AN OBJECT

TECHNICAL FIELD

The present invention relates to an identification apparatus, an identification system comprising such an identification apparatus and a method for identifying an object.

BACKGROUND

Many areas of daily life and industrial processes need a fast and error-free identification of objects.

Therefore, the application of identification patterns to an object and the readout and evaluation of the former by a receiver unit are known. Optoelectronically readable fonts consisting of parallel lines and interstices with different widths are known in the form of barcodes. Such a barcode can be read quickly and with low susceptibility to errors using an appropriate receiver unit, said barcode corresponding to standardized signs such that the object can be identified by way of an assigned identification string.

Both one-dimensional barcodes (e.g., EAN-13) and two-dimensional codes such as the QR code are known.

Such identification patterns are typically read in a scanning method: A laser beam emitted by a laser arranged in or on the receiver unit sweeps over the identification pattern and the reflection of the laser beam is detected by the receiver unit in order to separate regions that reflect more strongly from regions that reflect less strongly and thus to recognize the structure of the identification pattern. The disadvantage here is that high light levels of the reflected beam are required to facilitate a fast and error-free identification of the identification pattern.

SUMMARY

The present invention is therefore based on the object of providing an identification apparatus and a method for identifying an object which avoid the aforementioned disadvantages.

This object is achieved by an identification apparatus, an identification system comprising such an identification apparatus and a method for identifying an object having one or more features as described herein. Advantageous embodiments can be found below and in the claims.

The method according to the invention is preferably embodied to be carried out by the identification apparatus according to the invention and the identification system according to the invention, in particular by preferred embodiments thereof. The identification apparatus according to the invention and the identification system according to the invention are preferably embodied to carry out the method according to the invention, in particular preferred embodiments thereof.

The identification apparatus according to the invention comprises an optical detector, a controller and an identification transmitter unit. The optical detector has a detection area with an identification pattern that partly covers the detection area. The controller is embodied to interact with the detector and the identification transmitter unit in such a way that the identification transmitter unit is drivable to send an identification signal on the basis of an analysis of the time sequence of measurement signals of the detector.

The already known identification apparatuses, which only consist of an identification pattern, are passive units, the essential function of which consists of regions with stronger and regions with comparatively weaker reflection of a laser beam.

In contrast thereto, the identification apparatus according to the invention is an active unit: The detector of the identification apparatus has a detection area which is partly covered by the identification pattern. If a scanning beam, more particularly a punctiform or line-shaped scanning beam, preferably a laser beam as a scanning beam, for example, now sweeps over the identification pattern, a time sequence of signals of the detector is generated depending on the form and the arrangement of portions of the identification pattern. Consequently, there is not a spatially resolving simultaneous capture but a time-resolved serial capture. Thus, the information from the identification pattern is converted into information encoded sequentially in time by the scanning beam which sweeps over the identification pattern. An analysis of the temporal sequence of the measurement signals of the detector is possible by the controller. An identification signal is sent on the basis of this analysis. The identification pattern is therefore preferably embodied to reflect and/or absorb the scanning beam such that, in the regions of the detection region covered by the identification pattern, the scanning beam does not enter into the detection region, or at least only with a reduced intensity, in particular an intensity reduced by at least a factor of 10, preferably at least by a factor of 100, more particularly at least by a factor of 1000, in comparison with the scanning beam that strikes a region not covered by the identification pattern.

The identification apparatus according to the invention is advantageous in that sending an identification signal by the identification transmitter unit leads to substantially lower requirements being placed on the intensity of a laser beam for identifying the identification apparatus: In the identification apparatus according to the invention, it is not necessary for a laser beam reflected by the identification pattern or a laser beam reflected by interstices in the identification pattern to be reflected with a sufficient intensity to a receiver unit. Instead, a sufficient intensity of the identification signal emitted by the identification transmitter unit can always be ensured by the identification transmitter unit. In processes for identifying barcodes or QR codes known in advance, the beam reflected by the identification pattern is recorded by a camera. Accordingly, the actual code only represents a fraction of the captured camera image and so the information must be captured by image processing, for example by filtering. In the present invention only a specified information item is sent by the identification transmitter unit.

Thus, in comparison with the prior art, faster identification and an identification over greater distances is possible by the identification apparatus according to the invention.

The method according to the invention for identifying an object by an identification system includes the method steps of:

sending a scanning beam by a scanning beam transmitter unit such that the scanning beam sweeps over a detection area of a detector, partly covered by an identification pattern, of an identification apparatus, receiving radiation emanating from the identification apparatus.

What is essential is that the identification apparatus is used to evaluate measurement signals of the detector and actively send an identification signal by an identification transmitter unit of the identification apparatus on the basis of the measurement signal evaluation.

This results in the advantages listed above in relation to the description of the identification apparatus according to the invention and the advantages listed below.

The identification apparatus according to the invention and the method according to the invention for identifying an object consequently facilitate, firstly, a separation of a read signal (by the scanning beam), which is sent from a scanning beam transmitter unit to the identification apparatus, from the identification signal, which is sent by the identification apparatus to a receiver evaluation unit by the identification transmitter unit, said receiver evaluation unit usually being integrated in the scanning beam transmitter unit.

Furthermore, the controller can be used to prevent an identification signal being sent at all times: The controller is used to analyze the temporal sequence of measurement signals of the detector. In the case of a scanning optical scanning beam, which is emitted by a scanning beam transmitter unit and which sweeps over the detection area with the identification pattern, there is a temporal sequence of measurement signals of the detector on account of the partial coverage of the detection area by the identification pattern. Thus, as a matter of principle, it is possible to identify a "reading" of the identification apparatus by a scanning beam which sweeps over the detection area. In particular, such a reading operation can easily be distinguished from permanent illumination of the detection area.

In an advantageous embodiment, the controller is embodied to carry out high-pass filtering of the measurement signals of the detector. What this easily achieves is that an impingement of the detection area of the detector with radiation leading to a permanent or only slowly changing measurement signal of the detector is already filtered out by the high-pass filtering, and therefore no identification signal is sent in the presence of such measurement signals which do not exceed a specified minimum frequency. A particularly cost-effective advantageous configuration of the identification apparatus is obtained by virtue of the analysis of the temporal sequence of measurement signals being implemented only by way of high-pass filtering.

High-pass filters are known per se and can be realized cost-effectively as electronic components. Consequently, an analysis of the temporal sequence of measurement signals of the detector is realized in robust and cost-effective fashion in this advantageous embodiment. The minimum frequency of the change in the measurement signals of the detector, below which no identification signals are emitted, is preferably greater than 100 kHz, in particular greater than 1 MHz, in particular 5 MHz. Preferably, the specified minimum frequency of the high-pass filter ranges between 300 kHz and 3 MHz.

As described above, the identification apparatus according to the invention and, likewise, the method according to the invention are advantageous in that the identification signal is sent independently of a scanning beam since the identification signal is not generated passively by the reflection of the scanning beam but actively by the identification transmitter unit.

Advantageously the controller therefore has an amplifier unit in order to transmit the measurement signal in amplified fashion to the identification transmitter unit. In particular, this allows a greater distance between a transmitter- and receiver unit and the identification apparatus.

Advantageously, the measurement signal of the detector is thus sent in amplified and particularly preferably further-processed form as an identification signal by the identification transmitter unit.

In particular the combination of high pass filtering with an amplifier unit facilitates, in cost-effective and robust fashion, the realization of an identification apparatus which offers a significantly greater range in comparison with already known identification patterns such as barcodes, for example.

Advantageously, the measurement signal of the detector forms the basis for the emitted identification signal. In this advantageous embodiment, a basic form of a measurement signal of the detector is thus specified by the identification pattern over which a scanning beam sweeps, said basic form being sent as identification signal by the identification transmitter unit, possibly after further processing, for example by high-pass filtering and/or amplification as described above, in particular by high-pass filtering and amplification. This achieves a technically uncomplicated realization since there is no need for a complicated computing unit, in particular no computer unit, with a processor and a program memory.

The scope of the invention likewise includes carrying out more in-depth analysis and processing of the measurement signal of the detector. In a further preferred embodiment, the controller of the identification apparatus has a computing unit and a program memory, in particular a computer, in order to carry out an analysis of the temporal sequence of the measurement signals of the detector and, preferably, further analyses. Subsequently, an identification signal, in particular an identification signal stored in a program memory of the computing unit, can be sent by the identification transmitter unit independently of the basic form of the measurement signal of the detector. As a result of this, it is consequently possible to send any desired identification signal, in particular an always unchanging identification signal, by the identification transmitter unit, independently of, e.g., the speed with which a scanning beam sweeps over the detection area and the identification pattern. Usual data encoding can be resorted to for the purpose of encoding a recognition code for the identification apparatus. By way of example, an identifier as an identification signal can be transmitted using Morse code by the identification transmitter unit.

In an advantageous embodiment, the wavelength or the wavelength range of the scanning beam is different from the wavelength or the wavelength range of the radiation emitted by the identification transmitter unit. As a result, filtering in respect of the wavelength or the wavelength range of the identification transmitter unit can be implemented in the receiver unit so that a reflected scanning beam cannot lead to read errors. In a further advantageous embodiment, the detector area is provided at least in part, preferably at least in the regions not covered by the identification pattern, with a filter layer, which filters radiation outside of a specified scanning beam spectrum, or at least significantly attenuates the intensity thereof, preferably at least by a factor of 10, in particular at least by a factor of 100. As a result, there is a further coordination between the spectrum of the scanning beam and the identification apparatus since radiation from outside of the scanning beam spectrum does not penetrate into the detector, or only penetrates with a reduced intensity.

It is advantageous to use a detector with a large-area detection area for the identification apparatus according to the invention in order to facilitate a detailed identification pattern. Therefore, the detector is advantageously embodied as a semiconductor photodetector. In particular, it is advantageous that the detector is embodied as a perovskite photodetector. Perovskite photodetectors are advantageous in that a cost-effective, large-area production is possible and, moreover, in that response times significantly below 1 μs can be obtained (see https://doi.org/10.1038/ncomms13831).

Therefore, the detector preferably has at least one perovskite layer for absorbing the scanning beam and conversion of the latter into an electrical measurement signal.

The identification apparatus advantageously has a photovoltaic solar cell as a power supply. As a result, the required electrical energy is provided at least in part, preferably in full, by the conversion of incident radiation by the photovoltaic solar cell. It is particularly advantageous to additionally provide an energy buffer connected to the solar cell. This allows the energy of incident radiation to be buffered, even if there is no analysis and no locating of an identification signal at this time. Consequently, autonomous operation of an identification apparatus is facilitated, particularly also in the case of relatively long shadowing such as at night, for example.

Advantageously, the energy buffer is embodied as an accumulator with, preferably, a downstream capacitor, preferably designed using thin-film technology or an SMD design. This provides an energy buffer in a structurally simple, cost-effective and robust manner. Advantageously, the accumulator has storage capacity greater than 1 mAh, in particular greater than 50 mAh. In particular, the accumulator preferably has a capacity ranging from 1 mAh to 10 mAh. Advantageously, the capacitor has a capacitance greater than 3 µF, in particular greater than 50 µF. In particular, the capacitor preferably has a capacitance ranging from 1 µF to 10 µF.

Advantageously, the identification apparatus is configured in such a way that the controller is only switched on by the incidence in the controller of the signal induced by the arrival of scanning radiation on the detector, in particular after a passage of said signal through a high pass filter stage between the detector and the controller (such that no power is required to maintain the communication between the transmitter and receiver during the rest phase—i.e., the phase during which no information is exchanged).

A particularly cost-effective configuration is obtained in a further advantageous embodiment by virtue of the photovoltaic solar cell and the photodetector being embodied on the basis of the same semiconductor materials. In particular, it is advantageous that the photovoltaic solar cell and the photodetector are embodied on the basis of perovskite. This results in a cost-effective production process, in which there is simultaneous or at least immediately successive processing of solar cell and photodetector.

The identification apparatus is preferably embodied in such a way that the detection area is covered in a multiply alternate fashion by the identification pattern along at least one straight line on the detection surface. In an advantageous embodiment of the method according to the invention, the scanning beam sweeps over the detection surface along a straight line. As a result of the above-described advantageous embodiment of the identification pattern, the identification pattern multiply interrupts the ingress of the scanning beam into the detector or at least leads to a significant attenuation such that a temporal sequence of measurement signals is generated accordingly.

The identification pattern is preferably embodied in such a way that a utilized scanning beam does not penetrate to the detector or is at least significantly attenuated in the region of the detection surface covered by the identification pattern such that no measurement signal arises when the scanning beam strikes the identification pattern or, at least, a reduced measurement signal arises, in particular a measurement signal reduced by at least a factor of 2, preferably by at least a factor of 5, in particular by a factor of 10, in comparison with a measurement signal in which the scanning beam strikes a region of the detection surface that has not been covered by the identification pattern.

The identification pattern is preferably embodied in a manner known per se. In particular, the identification pattern is preferably embodied as a barcode. In the identification apparatus according to the invention, the barcode pattern is consequently converted into a temporal sequence of measurement signals in this advantageous embodiment when the scanning beam sweeps over the barcode. In contrast to already known applications of barcodes, the receiver unit however does not evaluate the reflected scanning beam but instead evaluates the identification signal sent by the identification transmitter unit.

The scope of the invention likewise includes the identification pattern being a two-dimensional pattern, in particular a QR code.

In a further advantageous configuration, the identification pattern is embodied as a three-dimensional pattern. Such a three-dimensional pattern consequently not only has structuring in the plane of the detection surface but also has structuring perpendicular to the plane of the detection surface of the detector.

This facilitates a determination of the angle between the scanning beam transmitter unit and the identification apparatus and/or the distance between the scanning beam transmitter unit and the identification apparatus. In an advantageous embodiment of the method according to the invention, the angle between the scanning beam transmitter unit and the detection area of the detector of the identification apparatus and/or the distance between the scanning beam transmitter unit and the identification apparatus is therefore determined by the measurement signal of the detector and/or the identification signal.

The object specified at the outset is likewise achieved by an identification system comprising an identification apparatus according to the invention, in particular a preferred embodiment thereof. The identification system has a scanning beam transmitter unit for sending the optical scanning beam, in particular a laser beam as a scanning beam. Furthermore, the identification system has a receiver unit for radiation emitted by the identification transmitter unit of the identification apparatus and has a receiver evaluation unit to identify the identification apparatus on the basis of received data of the receiver unit. Advantageously, the scanning beam transmitter unit, receiver evaluation unit and receiver unit are structurally connected to one another, in particular preferably integrated in a common housing.

The scanning beam transmitter unit is preferably embodied to scan the surroundings by the scanning beam, in particular to move the scanning beam in a scanning direction. The scope of the invention includes the case where the scanning beam carries out oscillating scanning movements and/or circular scanning movements and/or scanning patterns for scanning areas, in particular in a manner known per se in scanning apparatuses.

Advantageously, the scanning beam transmitter unit is embodied to emit a line-shaped scanning beam. Preferably, the line-like shape of the scanning beam is embodied perpendicular to a movement direction of the scanning beam, in particular perpendicular to a scanning direction, and so a band-like area is swept over during the scanning procedure. This increases the probability of impinging upon the identification apparatus during a scan.

In certain applications (monitoring autonomous machines in the workshop or objects moving toward one another), the application of a second detector with an identification pattern on the identification apparatus may be advantageous, particularly if aligned at 90° with respect to the first. By way of two crossing scanning processes that follow one another in time, advantageously in directions at 90° to one another, the relative position of the identification apparatus can be accurately determined on part of the identification system.

Advantageously, the identification apparatus according to the invention therefore has a further, second optical detector with a detection area and an identification pattern partly covering the detection area, wherein the identification pattern of the second detector preferably has the same embodiment as the identification pattern of the first detector. Like the first detector, the second detector is connected to the controller such that the temporal sequence of measurement signals of both detectors is analyzed by the controller. Preferably, the two detectors are arranged not parallel to one another, in particular preferably perpendicular to one another.

Advantageously, the scanning beam transmitter unit sends a scanning beam, in particular preferably a laser beam in continuous operation (continuous, CW). In comparison with other laser-based systems for object recognition/spatial orientation (e.g., lidar, light detection and ranging), this continuous laser can be operated in continuous operation with transmission powers harmless to humans (laser class A).

A further preferred embodiment of the identification system according to the invention envisages a combination with a lidar system: A lidar system facilitates a capture of the surrounding shapes by virtue of a pulsed signal being emitted and the time between emission and detection of the sent pulsed signal being measured. In this preferred embodiment, the scanning beam transmitter unit is additionally embodied as a lidar transmitter unit and the receiver unit and receiver evaluation unit are additionally embodied to receive and to evaluate in the style of a lidar system. Preferably, the scanning beam is modulated with a fast-pulsed signal here (in particular, faster by at least a factor of 10 than the signal that is generated when sweeping over the barcodes).

Here, the controller of the identification apparatus is preferably embodied to control the identification transmitter unit in such a way that the signal of the temporal sequence due to sweeping over the identification pattern by the scanning beam modulated by the signal on account of the pulsed scanning beam is emitted as identification signal. By analyzing the identification signal, it is consequently possible to carry out both an analysis in the style of a lidar system and an analysis, as described above, for identifying the identification apparatus; in particular, the relative distance to the identification apparatus can be calculated from the fast modulation signal. Unlike conventional lidar, substantially lower laser powers are required here (since the signal sent back is not reflected but amplified). Consequently, a substantially higher pulse rate can be achieved than in conventional lidar systems (in this case, the limitation for the pulse rate is the net laser energy which must not exceed an amount that is damaging to the human eye). Consequently, this version represents a lidar with selective recognition of a desired object (in comparison with conventional lidar, where only the relative position (direction and distance) of the sought object is recognized).

In an advantageous embodiment, the laser beam is focused to the estimated or known distance of the identification apparatus by adaptive optics.

The identification apparatus according to the invention, the identification system according to the invention and the method according to the invention significantly extend the use of identification patterns in relation to the already known use of barcode patterns, for example, and so new areas of application are opened up:

Thus, the present invention facilitates a fast recognition and assignment of marked objects in road traffic (automobiles, bicycles, apparel of pedestrians, signs, in particular road signs, obstacles, etc.), if these objects are respectively provided with an identification apparatus according to the invention. This increases safety, in particular for increasing the redundancy in conjunction with other recognition systems such as, for example, video cameras, lidar, etc. In particular, the disadvantage of lighting conditions that change over time, which also exists in the case of camera systems, can be avoided.

In particular in the case of vehicles such as automobiles, for example, there is a significant increase in the use of electronic systems. This currently relates to the improvement of driving safety and will in future relate to the introduction of completely autonomous vehicles. To this end, systems on the basis of scanning NIR short-term lasers (lidar) for measuring distance and on the basis of camera-based image processing for recognizing objects are currently under development. A plurality of mutually independent (redundant) systems and technologies are needed for safe driving operation. Even though autonomous driving under real conditions has already been demonstrated, a controlled response to events suddenly occurring in front or to the side has so far only been possible to an insufficient extent. Consequently, the technologies currently under development are associated with risks in this respect.

In a critical time interval below 1 s, corresponding to a braking distance of about 25 m at a vehicle speed of 50 km/h, current technologies cannot obtain enough information for a controlled braking and evasive reaction. This requires data for recognizing the type of obstacle, the position, alignment and relative speed thereof in time intervals significantly below 0.1 s and from a viewing radius that is as wide as possible. To be able to correspondingly accelerate the evaluation of image processing and the lidar data in this situation, there is the need for a further, very fast and fail-safe detection process for recognizing and assigning the obstacles and events. The latter is provided by the present invention.

Consequently, the present invention also comprises the use of the identification apparatus according to the invention for identifying objects in road traffic.

Just like traffic technology, industrial production is currently changing toward a significant increase in the flexibility of production. This is facilitated by increasing digitization and networking of production objects and production machines, based on the use of autonomous machines for individualized manufacturing. In a modern factory, this means that a communications network is established from machine to machine and from machine to production objects, just like infrastructure for the autonomous orientation of mobile machines, for example in the production hall, or, conversely, for monitoring of the movement of these machines within the production region. Independent monitoring of autonomous machines without having to access the position data ascertained in the machines is also desirable. The reliability of such monitoring, i.e., the fast and unique identification, represents a significant challenge for the current further development of production processes. In particular, this reduces the production speed.

Similar improvement potentials are also found in modern logistics, e.g. warehouse management by way of autonomous robots/shelves.

The use of RFID transponders or barcode systems as described above, in particular barcodes or QR codes, for identifying objects is known. These systems facilitate the identification of an object by way of an individual recognition signal. However, the short range, particularly in the case of RFID technology, is disadvantageous: The range is typically of the order of 1 m and only exceeds 6 m in exceptional cases. In the case of optical recognition by barcode technology such as barcodes or QR codes, there are the additional challenges of the resolution of the imaging optics (solid angle+depth of field) and the camera chip over the desired viewing angle and of image processing for reliably recognizing and decoding the signal.

These problems are circumvented by the present invention since there is an analysis of the temporal sequence of measurement signals of the detector of the identification apparatus at the location of the object by way of the controller and there is an active emission of an identification signal by the identification transmitter unit. As a result, significantly higher recognition rates and ranges can thus be obtained.

In an advantageous embodiment, the identification apparatus has at least one light guide.

BRIEF DESCRIPTION OF THE DRAWINGS

Further advantageous features and embodiments of the present invention are explained below on the basis of exemplary embodiments and the figures. In the figures.

DETAILED DESCRIPTION

The figures show schematic representations that are not true to scale. In FIGS. 1-6, the same reference signs denote elements that are the same or have the same effect.

Figure 1:
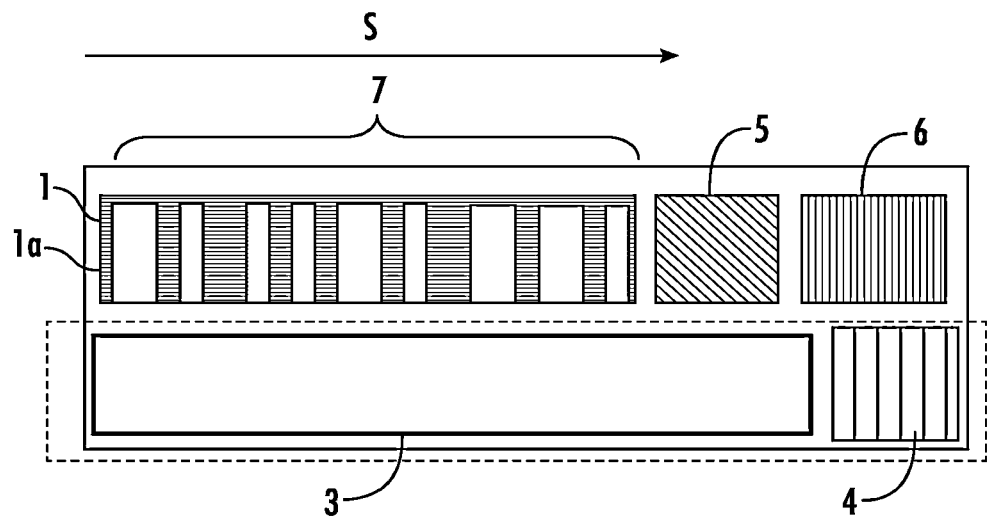
FIG. 1 shows a first exemplary embodiment of an identification apparatus according to the invention.

FIG. 1 shows the first exemplary embodiment of an identification apparatus according to the invention, in which the following elements are arranged on a common carrier plate: a first detector 1, a solar cell 3 and an energy buffer 4 embodied as an accumulator and/or capacitor, a controller 5 and a transmitter unit 6 embodied as an LED.

The detector 1 is embodied as a perovskite detector and consequently has a perovskite layer as a detection area 1a, which absorbs incident radiation and converts the latter into an electrical measurement signal by way of charge carrier separations. The detection area 1a of the optical detector 1 has an identification pattern 7 that partly covers the detection area 1a. The identification pattern 7 is embodied as a barcode and consequently has a plurality of elements arranged in a row. The elements have different thicknesses and different distances between the elements.

If a scanning beam now sweeps over the detection area 1a of the detector 1 along the scanning direction S, the scanning beam is intermittently absorbed by the identification pattern, and so a measurement signal of the detector 1 is only generated at the times at which the scanning beam strikes a region of the detection area 1a that is not covered by the identification pattern 7.

The measurement signal of the detector 1 is evaluated by the controller 5: The controller 5 has a high pass filter with a minimum frequency of 1 MHz and an amplifier unit with a gain factor of 3000. The output of the amplifier unit is connected to the transmitter unit 6. If, as described above, a scanning beam now sweeps over the detection area 1a in accordance with the scanning direction S, the time-modulated signal generated thereby is sent in amplified fashion by the transmitter unit 6 provided the speed of the sweep is high enough such that the measurement signals pass through the high pass filter.

In this case, the transmitter unit 6 embodied as an LED sends at a wavelength of 600 nm.

Hence an identification signal is emitted in cost-effective fashion by the transmitter unit 6, the structure of said identification signal being specified by the configuration and arrangement of the identification pattern 7.

The power required to this end is stored in the energy buffer 4, which is embodied as an accumulator with a downstream capacitor with a capacity of 5 mAh and a capacitance of 5 µF, respectively. Accordingly, the energy store is connected to the controller 5, which in turn is connected to the transmitter unit 6. Furthermore, the solar cell 3 embodied as a perovskite solar cell is connected to the energy buffer 4 via charging electronics. The energy buffer is charged if light impinges on the solar cell 3.

Figure 2:
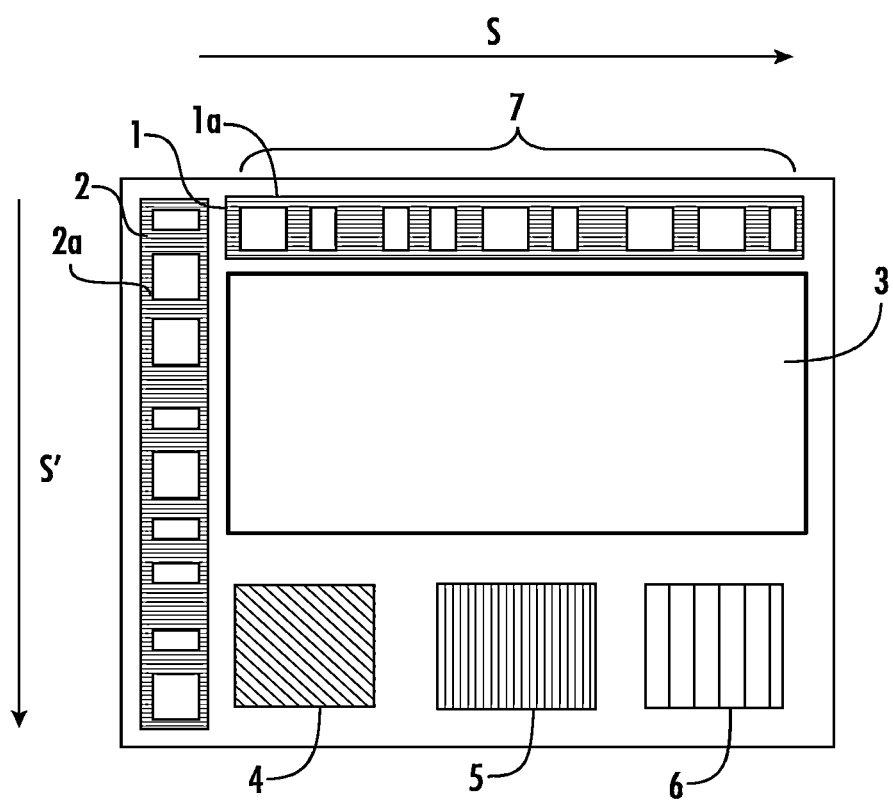
FIG. 2 shows a second exemplary embodiment of an identification apparatus according to the invention with a first and a second detector.

FIG. 2 illustrates a section of a second exemplary embodiment of an identification apparatus according to the invention. In terms of its basic design, the second exemplary embodiment corresponds to the first exemplary embodiment as per FIG. 1, and so only the substantial differences are discussed below:

In addition to the first detector 1, this embodiment has a second detector 2. Both detectors are partly covered by an identification pattern 7, as a result of which a scanning direction S (for detector 1) and a scanning direction S' for detector 2 arise. Detector 2 is arranged at a different angle to detector 1; S and S' are perpendicular to one another in this exemplary embodiment.

With this embodiment, the relative position of this identification apparatus (in the plane of the drawing) can be exactly determined on part of the identification system. To this end, two temporally successive line-shaped scans are carried out in different scanning directions, preferably perpendicular to one another.

As a result of assigning the signal sent back by the transmitter unit 6 to the respective angle of the emitted laser beam of laser 10, it is possible to accurately triangulate the position.

Figure 3:
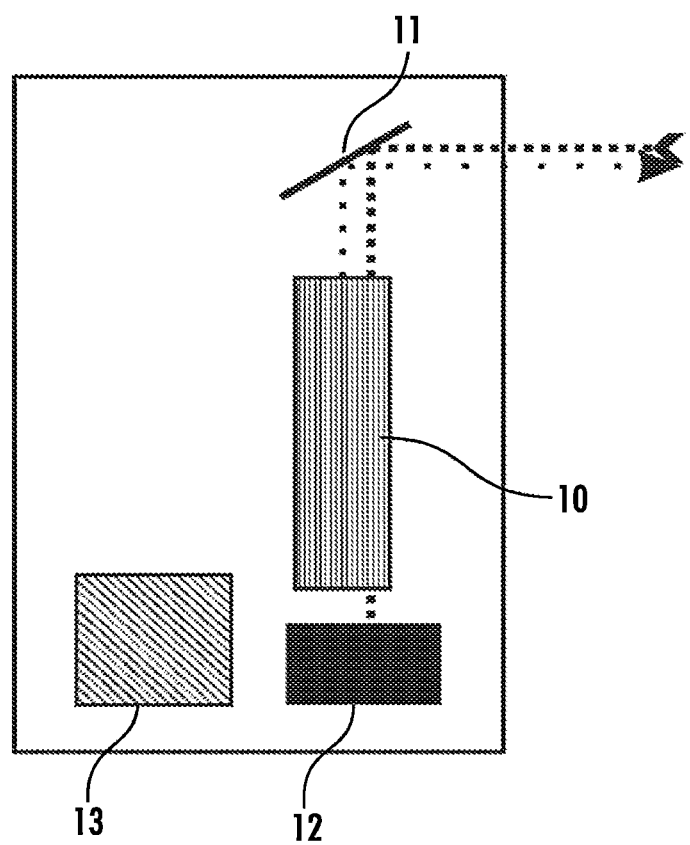
FIG. 3 shows an exemplary embodiment of a transmitter unit with a receiver evaluation unit.

FIG. 3 schematically illustrates a scanning unit with a receiver unit and a receiver evaluation unit. Together with the exemplary embodiment of an identification apparatus illustrated in FIG. 1, the scanning unit forms an exemplary embodiment of an identification system according to the invention.

The scanning unit has a laser 10, which generates a continuous laser beam at a wavelength of 700 nm. Consequently, the laser beam of the laser 10 represents an optical scanning beam. This scanning beam is deflected by a rotating mirror 11 and consequently sweeps over a region to be scanned. If the scanning beam sweeps over the detection area 1a of the identification apparatus illustrated in FIG. 1 in the process, the transmitter unit 6 emits the identification signal on account of the rotational speed of the mirror of 1000 RPM and a correspondingly sufficiently high frequency of the measurement signals of the detector 1.

Said identification signal is detected by a receiver unit 12 that is embodied as a photodetector. The measurement signals of the receiver unit 12 are analyzed by a receiver evaluation unit 13 that is connected to the receiver unit 12. The receiver evaluation unit 13 is embodied as a computing unit with a program memory and furthermore comprises a power source, which is likewise connected to the laser 10 and an electric motor for turning the rotating mirror 11.

The receiver evaluation unit now evaluates the measurement signal of the receiver unit 12 as follows: In a first data processing step, the analog input signals are filtered and the falling and rising signal edges are determined. A normalized signal interval is generated on the barcode by the first three bars for the correct determination of the time intervals. Thus, the signal can be converted into digital 1-0 character strings. The digitized signal is then compared to a database present in the receiver and thus assigned to the recognized object by way of the specific signature. From a comparison between the spatial and possibly temporal coordinates of the scanning laser beam, which are known in the receiver, it is possible to determine the scanning direction in which the object was at the time of the scan.

As a result of this, an identification of the identification device as per FIG. 1 is possible on the basis of the identification signal emitted by the transmitter unit 6.

Figure 4:
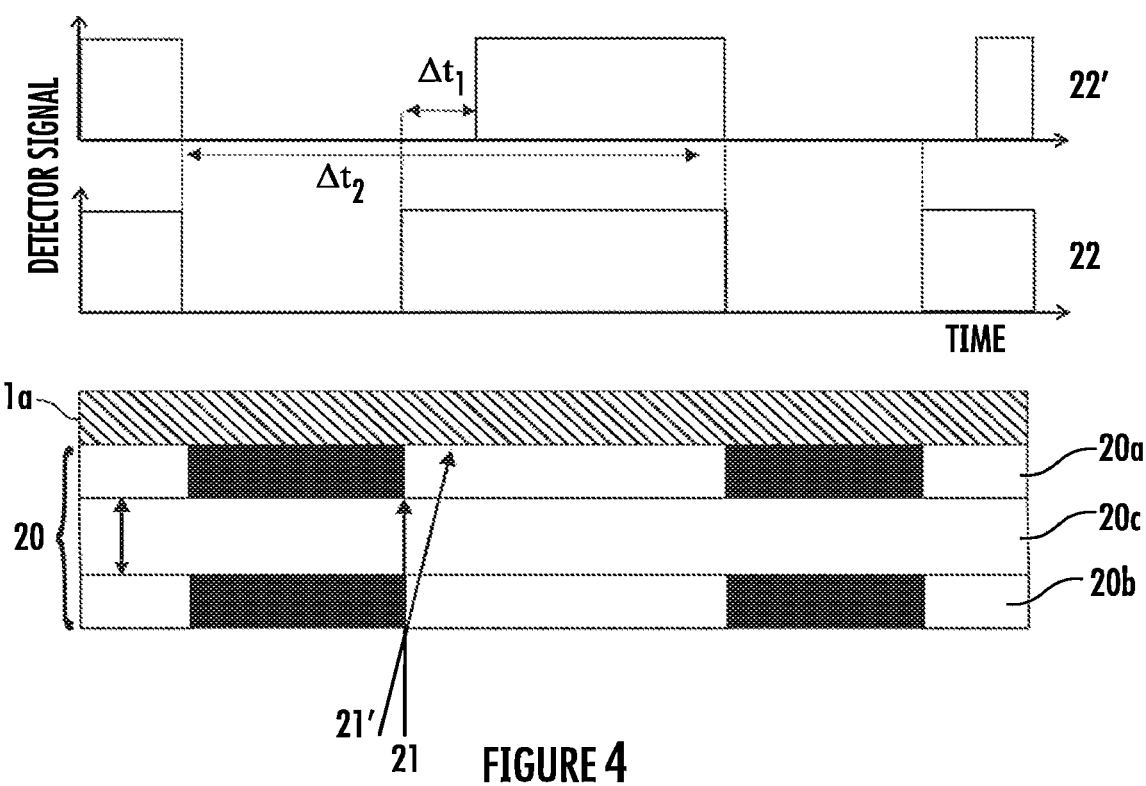
FIG. 4 shows a partial view of a third exemplary embodiment of an identification apparatus according to the invention for the purposes of explaining a three-dimensional identification pattern.

FIG. 4 illustrates a section of a third exemplary embodiment of an identification apparatus according to the invention. In terms of its basic design, the third exemplary embodiment corresponds to the first exemplary embodiment as per FIG. 1, and so only the substantial differences are discussed below:

The third exemplary embodiment has a three-dimensional identification pattern 20. For the sake of clarity, FIG. 4 only illustrates a section of the detection area 1a of the detector 1. The three-dimensional identification pattern 20 is arranged on the detection area 1a. FIG. 1 illustrates a plan view of the identification apparatus from above. FIG. 4 illustrates a cross section through the detection area 1a of the first detector 1 and the three-dimensional identification pattern 20 arranged thereon in order to show the layer structure of the three-dimensional identification pattern 20. Consequently, transferred to FIG. 1, this cross section extends along the direction S, perpendicular to the plane of the drawing and through the individual elements of the identification pattern 7 which, however, has been replaced by the three-dimensional identification pattern 20 in FIG. 2.

To elucidate the angle dependencies, the detection area 1a is illustrated as lying on the top in this cross section.

The three-dimensional identification pattern has the following layer structure:

A first barcode is formed in a first layer 20a and a second barcode is formed in a second layer 20b.

A transparent layer 20c is situated between the layers 20a and 20b. The layers 20a to 20c are formed from the following materials with the following thicknesses: Layers 20a and 20b consist of a transparent PET film, each with a thickness of 0.1 mm. Both have been partially printed on with a black ink, in the form of the desired barcode. Layer 20c consists of a transparent PET film with a thickness of 0.5 mm.

In the illustration as per FIG. 4, the patterns as per the first barcode of the first layer 20a and the second barcode of the second layer 20b correspond to one another and are consequently located above one another perpendicular to the detection area 1a.

This three-dimensional arrangement of two barcodes facilitates a determination of the angle between the barcode and the light source of a scanning beam such as the scanning unit as per FIG. 3: As described above, the two barcodes are attached above one another at a defined distance from one another. If the scanning beam as per illustration 21 strikes the barcode in perpendicular fashion, a temporal sequence of the measurement signals of the detector 1 forms which corresponds to the temporal sequence of a one-dimensional identification pattern, for example as per FIG. 1, with corresponding ratios of coverage and gaps between the covers. It should be noted here that the distance between scanning unit and identification apparatus is typically a multiple of the extent of the detector 1 in the scanning direction. Consequently, the approximate assumption can be made that the scanning beam 21 immediately has a constant angle relative to the detection area 1a when sweeping over the detection area 1a of the detector 1.

FIG. 4 schematically shows the temporal sequence 22 for the scanning beam 21 with perpendicular incidence over the detection area 1a. The measurement signal [a.u.] of the detector 1 is plotted on the x-axis and the time [a.u.] on the y-axis.

By contrast, if the scanning beam does not strike the detection area 1a at right angles, as illustrated in example 21', there is a change in the shadowing pattern: In the illustrated case of two identical barcodes 1 and 2, the coverage regions broaden in the case of the scanning beam 21' in relation to the coverage regions that act on the scanning beam 21. As is evident from the temporal sequence 22', the temporal sequence 22' has longer shadowing times and consequently signal sinks in relation to the temporal sequence 22.

The angle of incidence of the scanning beam 21 and 21' can be calculated from the measurement signal of the detector 1 if the geometric parameters of the two barcodes are known, i.e., in particular, the size and distance of the shadowed regions and thicknesses of the layers 20a to 20c. This is even possible if the angular speed of the rotating mirror 11 and the distance between the scanning unit and the identification apparatus are unknown. If, as described above, the width of the transparent and opaque regions of the barcodes and the distance of the barcodes from one another (in particular the thicknesses of the three layers 20a to 20c), the controller 5 of the identification apparatus can be embodied to calculate the angle of incidence of the scanning beam 21, 21'.

The angle of incidence of the scanning beam 21, 21' can likewise be calculated by the receiver evaluation unit 13. To this end, information about the dimensions of the barcode is required, for example a standardized size of broad and narrow bars of the barcodes and the distance of the two barcodes from one another in a direction perpendicular to the detection area 1a.

In conclusion, the relative pulse width, i.e., the ratio between "bright" and "dark" or measurement signals and no measurement signal, as illustrated by the pulse width changes $\Delta t_1$ in the temporal sequence 22', and the duration for the entire scan of the barcode consequently change depending on the angle of the scanning unit with respect to the identification apparatus with the three-dimensional identification pattern.

In the case of a one-dimensional identification pattern, such as the barcode as per FIG. 1, the overall duration of the scan, i.e., the overall duration required by the scanning beam to sweep over the detection area 1a, changes (like in the case of a three-dimensional identification pattern, too) on the basis of the scanning speed, for example the rotational speed of the rotating mirror 11. In both cases, the scanning speed can be determined by way of the distances of the front edge of a shadowing region, as shown in exemplary fashion by $\Delta t_2$ in the temporal sequence 22'. To this end, there must be again a convention about the spatial dimensions of barcodes as described above, such that the scanning time can be converted into a scanning speed.

If, furthermore, the distance and the angle of two three-dimensional barcodes with respect to one another are known, it is possible to also determine the position of the light source relative to these barcodes and consequently also the distance thereof.

Figure 5:
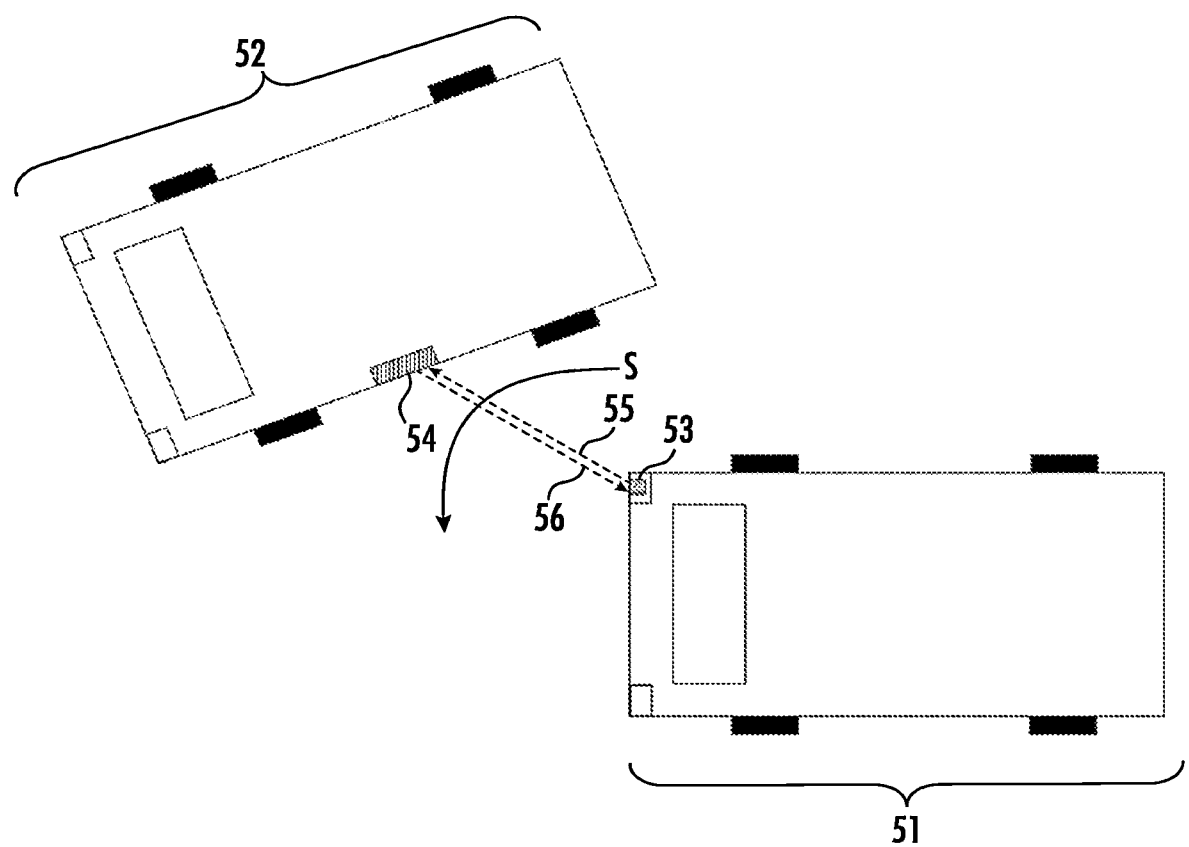
FIG. 5 shows an application example for automobiles.

FIG. 5 schematically shows an application example of the invention.

Two passenger motor vehicles (automobiles) 51 and 52 are shown. The automobile is equipped with an identification system 53. In this case, the identification system is attached in the lighting system of the automobile. An identification apparatus 54 is attached to the side of automobile 52. A scanning beam 55 is emitted along the scanning direction S by the identification system. When the identification apparatus 54 is swept over, the latter emits an identification signal 56, which is detected by the identification system 53. The received data are processed further in the on-board computer of the automobile 51. Firstly, there is recognition there that this relates to another automobile. Identification apparatus 54 is configured with a three-dimensional structure, as described in FIG. 4. Consequently, it is possible to calculate the alignment of automobile 52 to automobile 51. Moreover, it is possible to calculate the relative speed of automobile 52 after a few scans. Ideally, automobile 51 is also equipped with further systems such as lidar, radar or cameras. In combination, the illustrated scenario can be calculated very reliably and very quickly: Automobile 52 cuts into the lane of automobile 51 at a short distance. The on-board computer of automobile 51 can now introduce measures for avoiding a collision in a timely fashion.

Figure 6A:
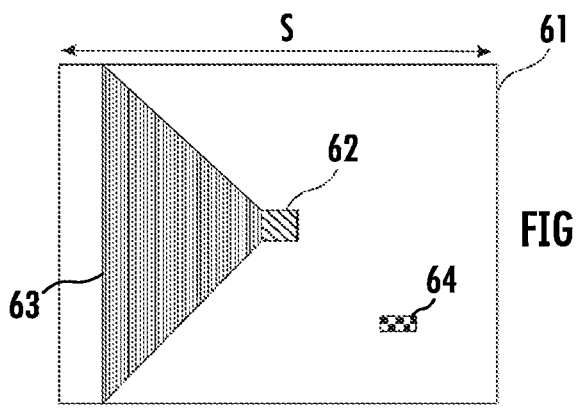
FIGS. 6A-6C show an application example for identifying and locating objects in rooms.
Figure 6B:
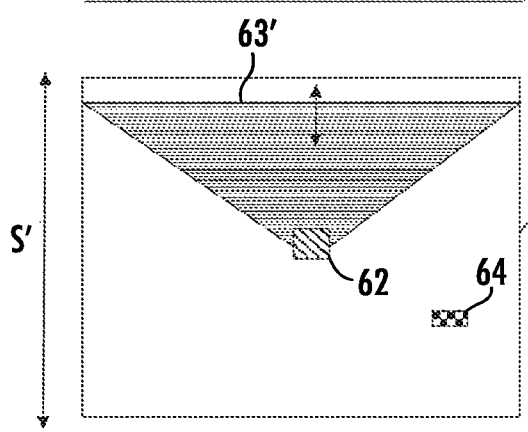
Figure 6C:
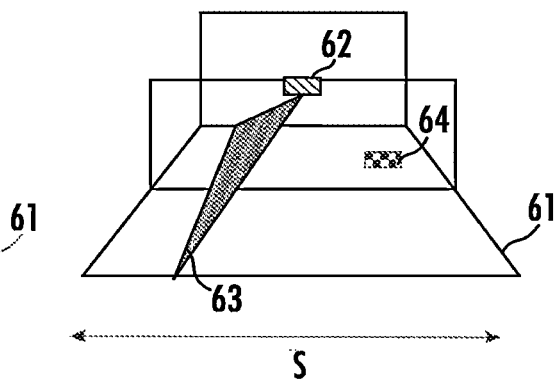

FIGS. 6A-6C shows a second application example. FIGS. 6A and 6B schematically show the plan view of a workshop, which is delimited by the walls 61. An identification system 62, which radiates a line-shaped laser beam 63 on the floor of the workshop, is located on the ceiling. As illustrated in FIG. 6A, this laser beam 63 is scanned through the workshop along axis S. This is followed, as illustrated in FIG. 6B, by a second scan with a laser beam 63' along the axis S' which is perpendicular to S. In this way, the workshop is completely scanned twice. Thus, the identification apparatus 64, which is attached to an autonomous machine, is determined in each scan. In this case, the identification apparatus 64 has two mutually perpendicular detectors, as described in FIG. 2. Thus, the position along axis S is registered in FIG. 6A and the position along axis S' is registered in FIG. 6B. Accordingly, the exact position of the machine in the workshop can be determined from the two scans. For better understanding, FIG. 6C illustrates the oblique 3D view of the scenario from FIG. 6A.

LIST OF REFERENCE SIGNS

1 First detector
1a Detection area
2 Second detector
3 Solar cell
4 Energy buffer
5 Controller
6 Identification transmitter unit
7 Identification pattern
10 Scanning beam transmitter unit
11 Rotating mirror
12 Receiver unit
13 Receiver evaluation unit
20 Three-dimensional identification pattern
20a First layer
20b Second layer
20c Transparent layer
21, 21' Scanning beam
22, 22' Temporal sequence

The invention claimed is:

1. An identification apparatus comprising:
an optical detector having a detection area with an identification pattern that partly covers the detection area;
an identification transmitter unit;
a controller configured to interact with the optical detector and the identification transmitter unit such that when the identification pattern is swept by a scanning beam, a generation of a temporal sequence of measurement signals of the detector is generated depending on the shape and the arrangement of partial areas of the identification pattern and the identification transmitter unit is drivable to send an identification signal based on an analysis of a time sequence of measurement signals of the detector.

2. The identification apparatus as claimed in claim 1, wherein the controller is further configured to carry out high-pass filtering of the measurement signals of the detector.

3. The identification apparatus as claimed in claim 1, wherein the controller has an amplifier unit so that it is configured to transmit the measurement signal in amplified fashion to the identification transmitter unit.

4. The identification apparatus as claimed in claim 1, wherein the optical detector is embodied as a semiconductor photodetector.

5. The identification apparatus as claimed in claim 1, wherein the identification apparatus has a photovoltaic solar cell as a power supply and an energy buffer connected to the solar cell.

6. The identification apparatus as claimed in claim 5, wherein the photovoltaic solar cell and the photodetector are formed using the same semiconductor materials.

7. The identification apparatus as claimed in claim 1, wherein the identification pattern is embodied such that a detection surface is covered in a multiple alternate fashion by the identification pattern along at least one straight line on the detection surface.

8. The identification apparatus as claimed in claim 1, wherein the identification pattern is embodied as a three-dimensional pattern.

9. The identification apparatus as claimed in claim 8, wherein the identification pattern has at least one first and one second pattern plane, the first pattern plane is arranged between the second pattern plane and the detection area, and an optically transparent plane is arranged between the first and the second pattern plane.

10. An identification system comprising an identification apparatus, a scanning beam transmitter unit, and a receiver unit, the identification apparatus comprising:
an optical detector having a detection area with an identification pattern that partly covers the detection area;
an identification transmitter unit;
a controller configured to interact with the optical detector and the identification transmitter unit such that when the identification pattern is swept by a scanning beam, a generation of a temporal sequence of measurement signals of the detector is generated depending on the shape and the arrangement of partial areas of the identification pattern and the identification transmitter unit is drivable to send an identification signal based on an analysis of a time sequence of measurement signals of the detector;
the scanning beam transmitter unit configured for sending an optical scanning beam; and
the receiver unit configured for receiving radiation emitted by the identification transmitter unit, and a receiver evaluation unit configured to identify the identification apparatus based on received data of the receiver unit.

11. A method for identifying an object by an identification system, the method comprising:
sending a scanning beam by a scanning beam transmitter unit such that the scanning beam sweeps over a detection area of a detector, partly covered by an identification pattern, of an identification apparatus, the detector thereby generating a temporal sequence of measurement signals depending on the shape and the arrangement of partial areas of the identification pattern;
receiving radiation emanating from the identification apparatus;
evaluating, by the identification apparatus, the measurement signals to produce a measurement signal evaluation; and
sending an identification signal by an identification transmitter unit of the identification apparatus based on the measurement signal evaluation.

12. The method as claimed in claim 11, wherein a wavelength or wavelength range of the scanning beam is different from a wavelength or a wavelength range of the radiation emitted by the identification transmitter unit.

13. The method as claimed in claim 11, further comprising the measurement signal evaluation comprising high-pass filtering of the measurement signal of the detector.

14. The method as claimed in claim 11, further comprising emitting the measurement signal of the detector in amplified form as an identification signal by the identification transmitter unit.

15. The method as claimed in claim 11, wherein at least one of an angle between the identification transmitter unit and detection area of the detector of the identification apparatus or a distance between the identification transmitter unit and identification apparatus is determined by at least one of the measurement signal of the detector or the identification signal.

16. The method as claimed in claim 11, further comprising taking an additional distance measurement based on a measured light time-of-flight of the scanning beam.

* * * * *